United States Patent
Dayton

(10) Patent No.: US 7,762,615 B2
(45) Date of Patent: Jul. 27, 2010

(54) VEHICLE AIR DAM SYSTEM

(76) Inventor: Roderick Dayton, 17212 Misty Lake Dr., Strongsville, OH (US) 44136

( * ) Notice: Subject to any disclaimer, the term of this patent is extended or adjusted under 35 U.S.C. 154(b) by 1037 days.

(21) Appl. No.: 10/585,174

(22) PCT Filed: Apr. 20, 2006

(86) PCT No.: PCT/US2006/014906

§ 371 (c)(1),
(2), (4) Date: Jun. 30, 2006

(87) PCT Pub. No.: WO2006/115988

PCT Pub. Date: Nov. 2, 2006

(65) Prior Publication Data

US 2008/0303309 A1 Dec. 11, 2008

Related U.S. Application Data

(60) Provisional application No. 60/673,506, filed on Apr. 21, 2005, provisional application No. 60/762,329, filed on Jan. 26, 2006.

(51) Int. Cl.
*B60J 1/20* (2006.01)
*B62D 35/02* (2006.01)
(52) U.S. Cl. .................................. 296/180.1
(58) Field of Classification Search ... 296/180.1–180.5; 180/903
See application file for complete search history.

(56) References Cited

U.S. PATENT DOCUMENTS

| | | | |
|---|---|---|---|
| 3,524,672 A | 8/1970 | Rawlings | |
| 4,262,953 A | 4/1981 | McErlane | |
| 4,421,354 A | 12/1983 | Lemaster | |
| 4,486,046 A | 12/1984 | Whitney et al. | |
| 4,585,262 A | 4/1986 | Parks | |
| 4,640,541 A | 2/1987 | Fitzgerald et al. | |
| 4,659,130 A | 4/1987 | Dimora et al. | |
| 4,902,067 A | 2/1990 | Sakai et al. | |
| 5,280,990 A * | 1/1994 | Rinard | 296/180.1 |
| 5,375,882 A | 12/1994 | Koch, III | |
| 6,079,769 A | 6/2000 | Fannin et al. | |
| 6,644,700 B2 * | 11/2003 | Ito et al. | 293/117 |
| 6,685,256 B1 | 2/2004 | Shermer | |
| 6,837,536 B1 | 1/2005 | Schwartz | |
| 6,974,178 B2 | 12/2005 | Ortega et al. | |

(Continued)

FOREIGN PATENT DOCUMENTS

DE 103 15 885 A1 4/2003

*Primary Examiner*—H Gutman
(74) *Attorney, Agent, or Firm*—Pearne & Gordon LLP

(57) ABSTRACT

An air dam is made of flexible cells installed adjacent to one another so that the air dam is capable of installation in many deflecting configurations on a vehicle and can also deflect under impact. The air dam system may be capable of being deployed at higher speeds while being stowed under the frame of the truck when the truck is operating on rough road surfaces to reduce the potential for air dam damage. The air dam system can be actuated pneumatically and when deployed tends to reduce aerodynamic drag by altering the path of airflow under and/or immediately around a vehicle. Other methods of actuation such as hydraulic or mechanical components may also be used with the air dam system. Alternatively, the air dam cells may be stationary and include an inflated bladder and/or flexible sleeve mounted adjacent to one another on an air dam frame.

24 Claims, 7 Drawing Sheets

U.S. PATENT DOCUMENTS

| | | |
|---|---|---|
| 7,040,690 B2 | 5/2006 | Soja et al. |
| 7,055,891 B2 | 6/2006 | Jungert |
| 7,093,889 B2 | 8/2006 | Graham |
| 7,240,958 B2 | 7/2007 | Skopic |
| 7,578,541 B2 * | 8/2009 | Layfield et al. .......... 296/180.2 |
| 2005/0146161 A1 | 7/2005 | Uland |

* cited by examiner

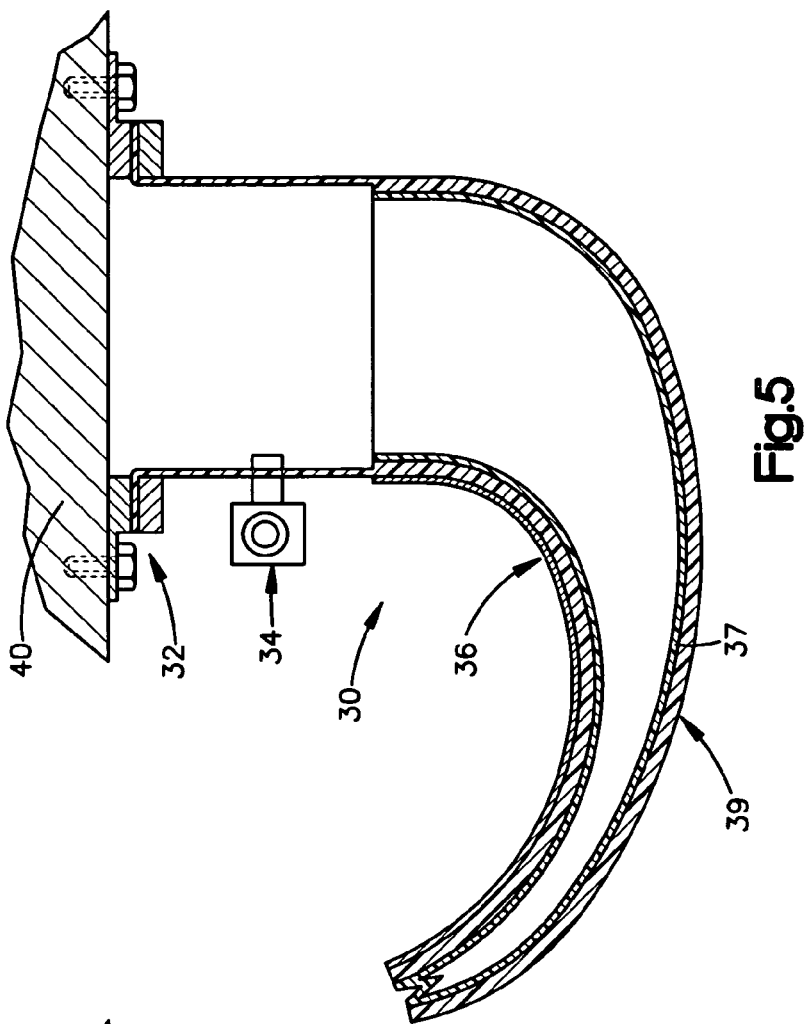
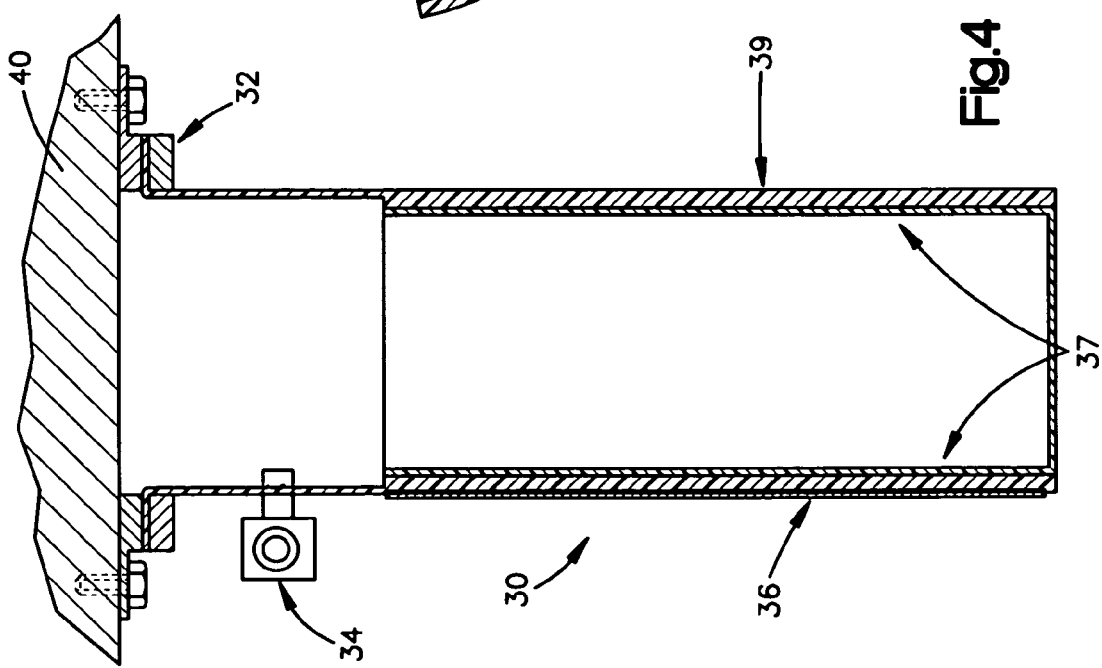

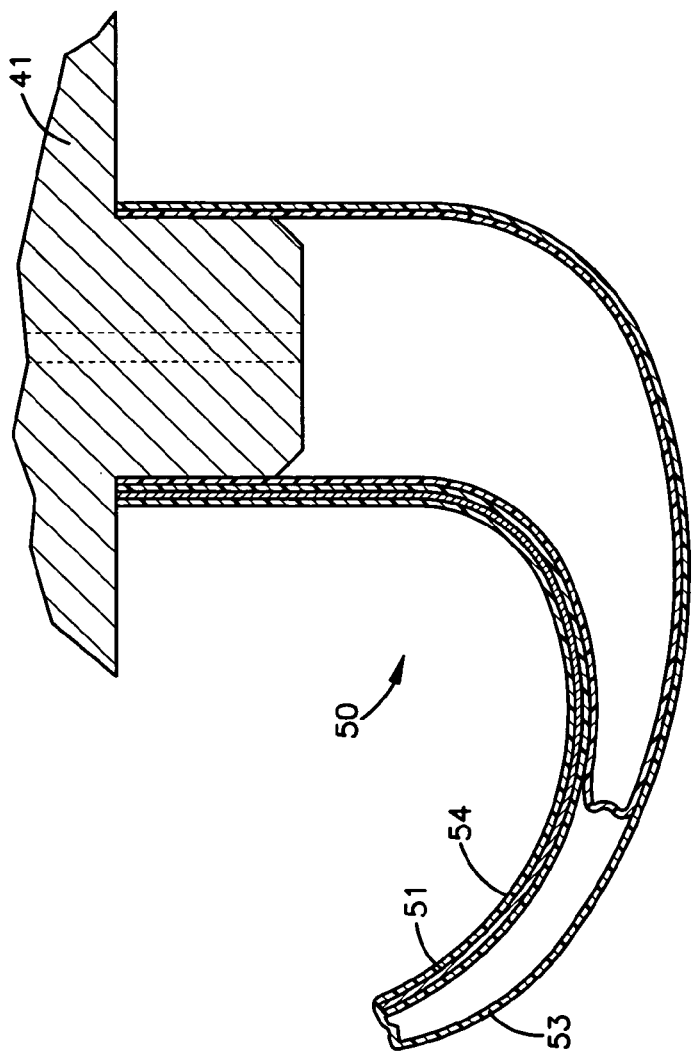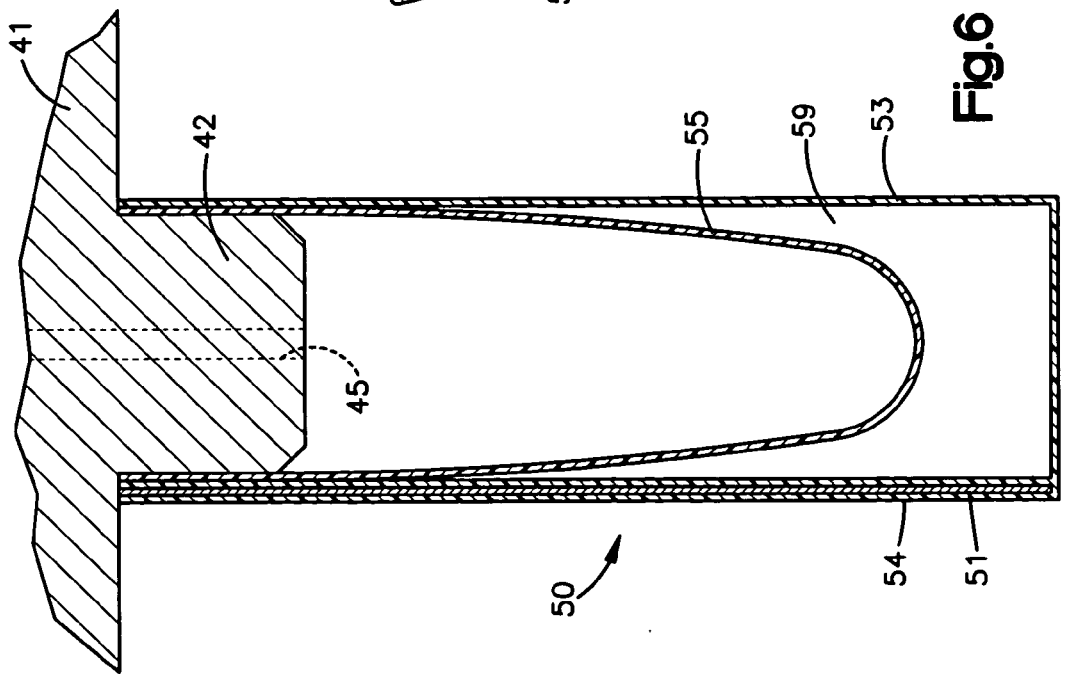

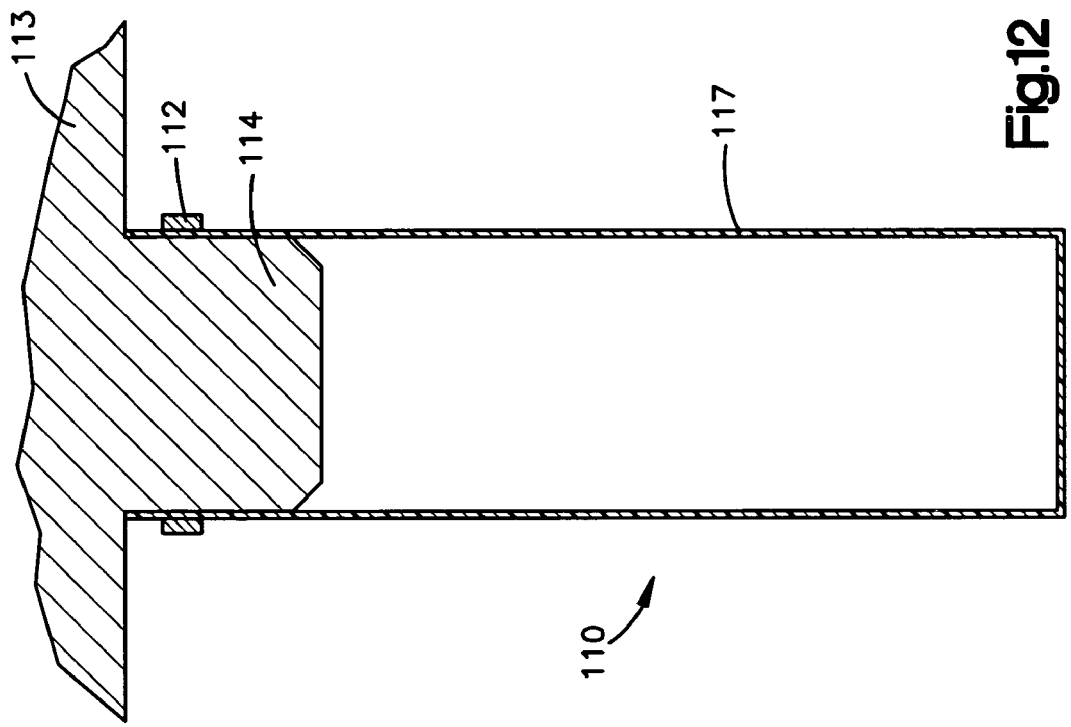
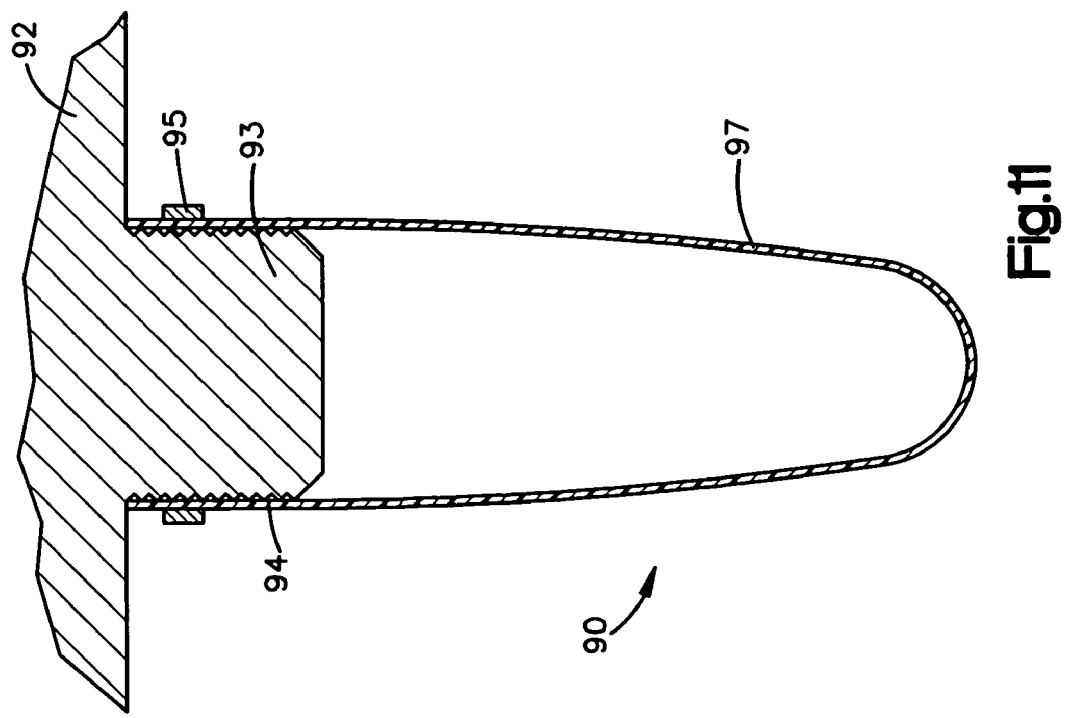

VEHICLE AIR DAM SYSTEM

CROSS REFERENCES TO RELATED APPLICATIONS

The present application claims priority to International Application Serial Number PCT/2006/014906 having an international filing date of Apr. 20, 2006, which claims priority to U.S. Provisional Patent Applications 60/762,329 having a filing date of Jan. 26, 2006 and 60/673,506 having a filing date of Apr. 21, 2005. The entireties of the aforementioned patent applications are incorporated herein by reference for all purposes.

TECHNICAL FIELD

The invention relates generally to the field of over-the-road vehicles and more particularly to vehicle components directed at reducing the aerodynamic drag of over-the-road vehicles.

BACKGROUND

Fuel efficiency is of increasing importance to the operation of land vehicles in light of rising fuel prices and ecological concerns. This is especially true in the field of over-the-road highway trucks. These trucks travel great distances at relatively high speeds. Any improvement that reduces the aerodynamic drag on the truck at highway speeds can have a significant impact on the fuel economy of the truck.

Typically, over-the-highway trucks include a number of body components aimed at reducing drag and improving fuel economy. For example, some trucks have fairings installed above the roof of the cab to direct air more smoothly over the transition between the cab and the trailer. The design of hoods and fenders focuses on creating an aerodynamic surface. Another component that is often used to reduce drag is the air dam, which is a deflective shield installed between the frame of the truck and the ground. An air dam routes air around the truck's bottom smoothly to improve aerodynamic performance. Most air dams are constructed of relatively rigid materials that can be cracked or damaged by uneven road surfaces that may be found on parking lots and surface roads. Because of the potential for damage, additional clearance between the air dam and the ground may be necessary at the expense of the air dam's performance at highway speed on smooth road surfaces.

SUMMARY

An air dam that is made of flexible cells installed adjacent to one another is capable of installation in many deflecting configurations on a vehicle and can also deflect under impact.

In one exemplary air dam system described herein, the air dam system is capable of being deployed at higher speeds while being stowed under the frame of the truck when the truck is operating on rough road surfaces to reduce the potential for air dam damage. The air dam system can be actuated pneumatically and when deployed tends to reduce aerodynamic drag by altering the path of airflow under and/or immediately around a vehicle. Other methods of actuation such as hydraulic or mechanical components may also be used with the air dam system. The air dam system may be designed into future production vehicles or added to an existing vehicle as a retrofit device. While targeted to the "over the road" Class 8 truck market, the device is equally applicable to virtually all modes of ground transportation.

The exemplary pneumatic air dam system consists of multiple flexible hollow or inflated structures in various geometric forms having cross sectional shapes such as circles, ovals, rectangles, and trapezoids and a height of sufficient length to span from the truck's underside to just above the ground. These structures are herein referred to as cells, and for the purposes of this description each cell has a circular cross section of approximate four inches in diameter and is approximately nine inches long. To form the air dam system, multiple cells are placed together with each cell's long edge abutted to the next cell's long edge to form a continuous barrier. Each cell is made of an internal inflatable bladder and/or a flexible impact resistant sheath. Since the cell is flexible, significant impacts will cause the cell to deflect, such as when the cell makes contact with debris on the paved surface over which the vehicle is traveling. In such an impact situation, the cell, upon removal of the deflecting force, returns to its pre-deflected state and position.

According to one embodiment, the cells are inflatable bladders that are selectively deployable. When the bladder is filled with air, the cell becomes more rigid so that the cell will not deflect under the pressure of air moving at velocities typically encountered in a vehicle traveling on a paved surface. When the air dam system is not activated, the deflated cells are lifted up toward the undercarriage of the truck such that the deflated cell is removed from general sight and impact. A spring steel wire is contained in the sleeve to provide a retracting force to lift the deflated cell when the air dam system is not activated. The spring steel lifting force is overcome when the system is active.

In alternative embodiments, the air dam system cells can include only an inflated bladder or a flexible sleeve. The inflated cell may or may not be enclosed in a flexible sleeve. By removing the pneumatic actuation feature, the need for air channels within the mounting structure is eliminated. An air dam system that includes cells that are either inflated bladders or flexible sleeves retains benefits such as the ease of placing the cells in a variety of configurations and the deflection under impact while simplifying the design.

BRIEF DESCRIPTION OF THE DRAWINGS

FIGS. 4 and 5 are cross sectional views of an air dam cell constructed in accordance with an embodiment of the present invention;

FIGS. 6 and 7 are cross sectional views of an air dam cell constructed in accordance with an alternative embodiment of the present invention;

FIG. 11 is a cross sectional view of an air dam cell constructed in accordance with an embodiment of the present invention;

FIG. 12 is a cross sectional view of an air dam cell constructed in accordance with an embodiment of the present invention.

DESCRIPTION

Figure 1:
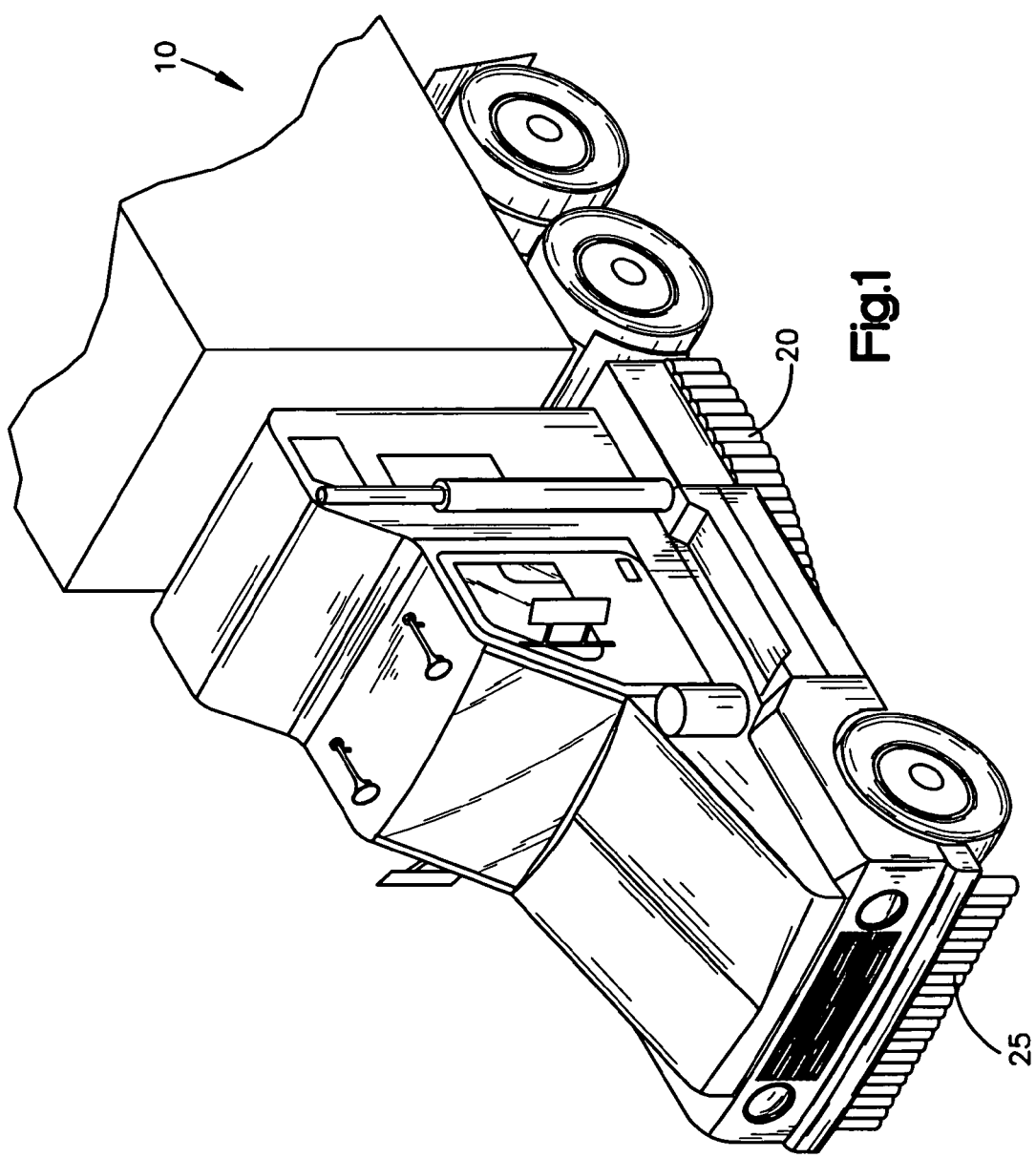
FIG. 1 is a perspective overview of an over-the-highway truck that includes an air dam system constructed to one embodiment of the present invention.
Figure 2:
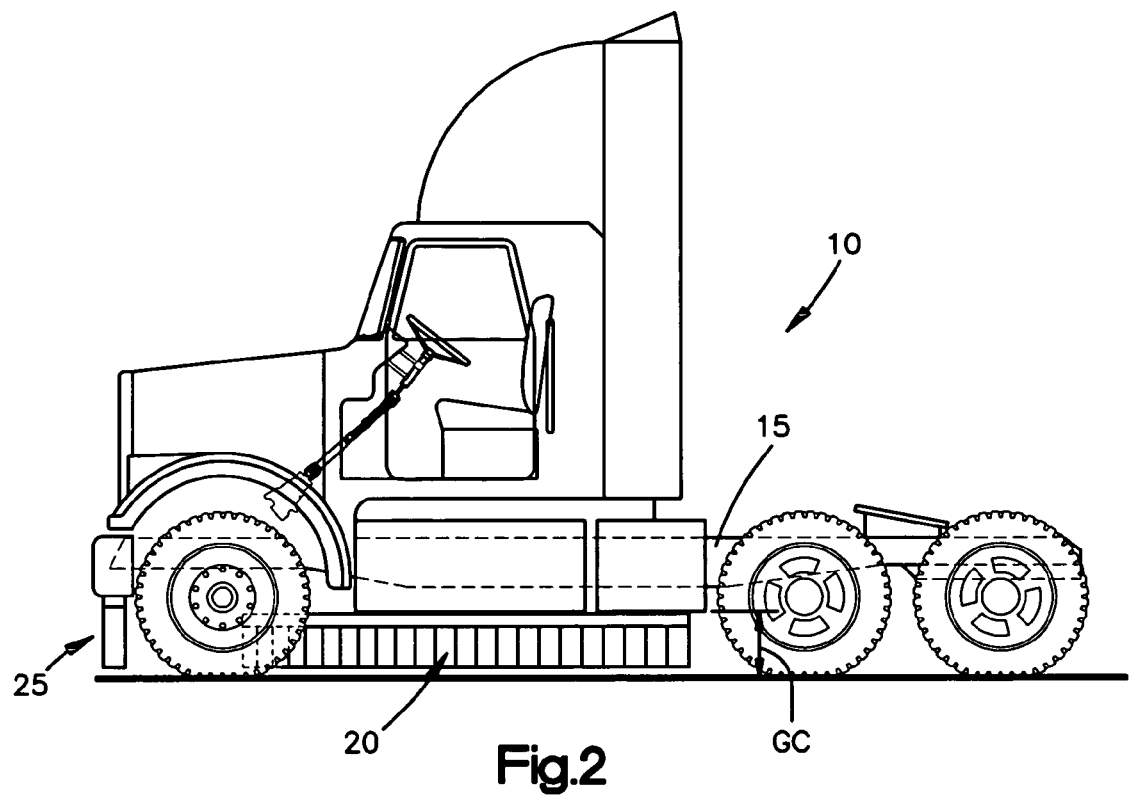
FIG. 2 is a side view of the truck of FIG. 1.
Figure 3:
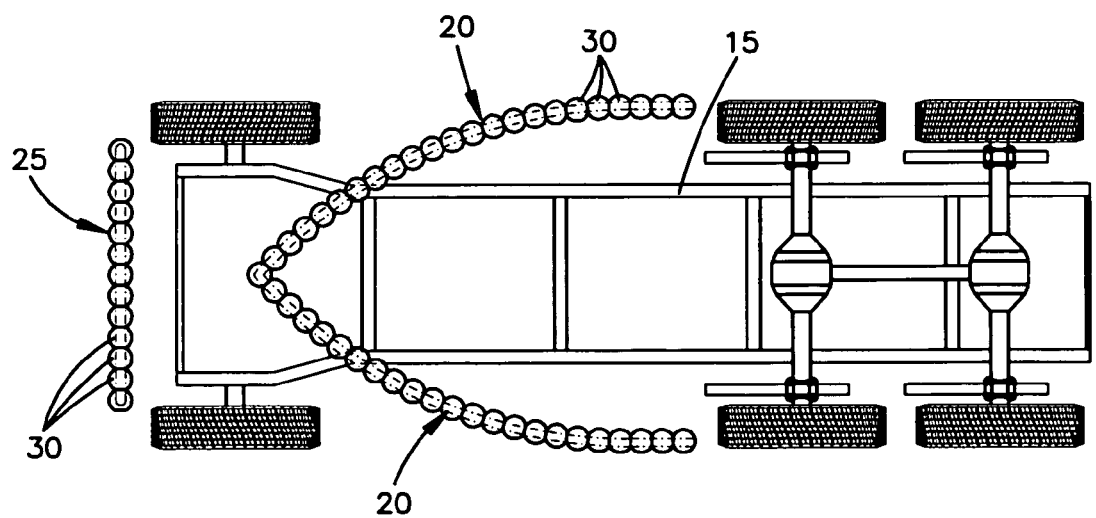
FIG. 3 is a view from below the truck of FIG. 1.
Figure 8:
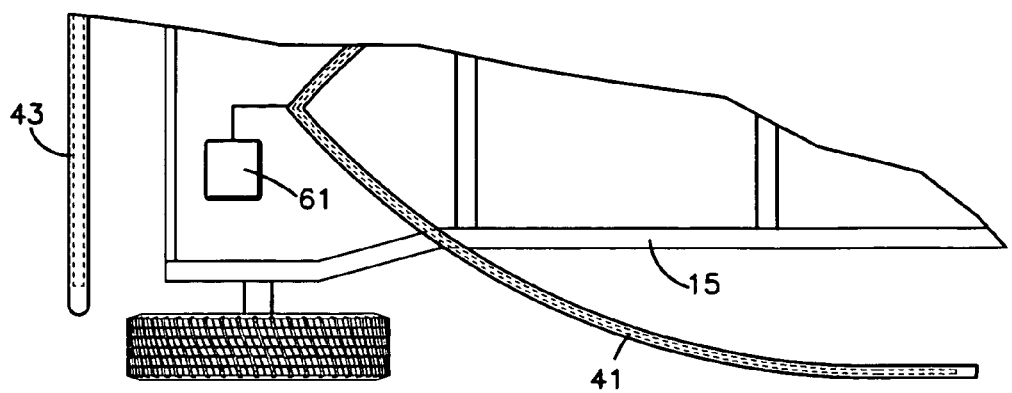
FIG. 8 is a cut away view of an air dam cell support and mounting structure constructed in accordance with an embodiment of the present invention.
Figure 13:
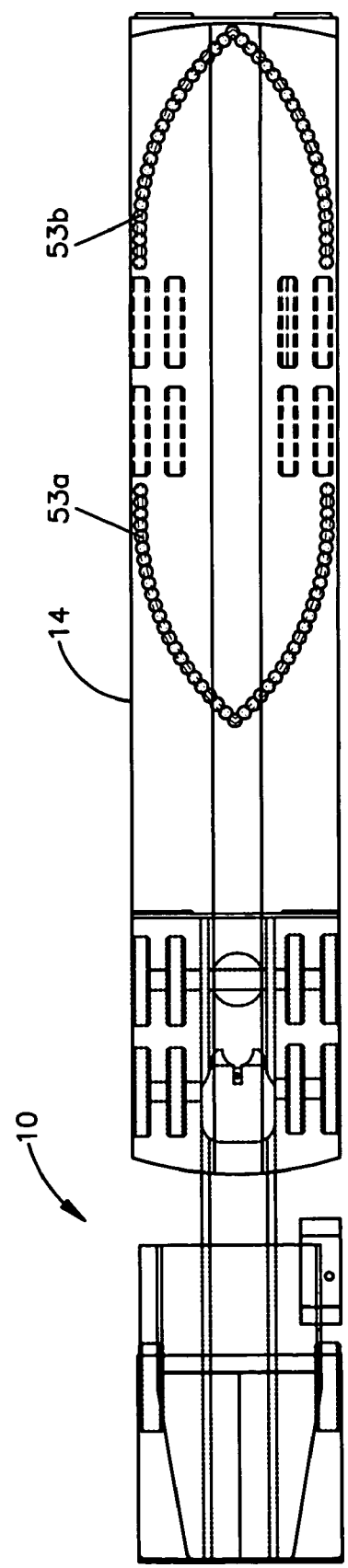
FIG. 13 is a top view of a trailer that includes an air dam constructed in accordance with alternative embodiments of the present invention.

FIGS. 1, 2, and 3 provide an overall view of the air dam system installed on a class 8 truck tractor 10. It is believed that installing a trailer air dam system 53a and/or 53b on the trailer 14 as shown in FIG. 13 will provide additional wind resistance benefits. The illustrated air dam system includes undercarriage and front cell banks 20, 25 that each consist of a row of abutting cells 30 as will be described below. The undercarriage and under-trailer banks have a generally ogival shape of sharpness 0.5 to 3.5 that originates at approximately the middle width of the cab or trailer. When mounted on the cab, the under-carriage bank 20 originates lengthwise at approximately coincident with the front axle. When mounted on the trailer, the under trailer bank 53a, 53b can be positioned in front of the rear wheels of the trailer 14 as indicted by 53a and/or behind the wheels so that the ogival shape originates at the rear of the trailer as indicated by 53b.

In practice, the cells 30 are suspended from the underside of the truck frame 15 such that, for example, the four inch diameter sections are attached to a mounting structure that is fixed to the frame 15 and the nine inch lengths extend down toward the ground. When aligned in this manner, the cells form a barrier blocking the primary flow of air under and/or immediately around the vehicle. FIG. 2 shows a side view of the cells installed on a truck with GC indicating the air gap filled by the cells when inflated. FIG. 3 shows the typical spatial placement left to right and the resultant air path blockage created by the inflation of the cells. Blocking the primary flow of air under the vehicle causes a reduction in the drag created by air turbulence under the carriage of the vehicle and has the resultant effect of improving fuel efficiency.

FIG. 3 shows the typical cell locations with respect to the vehicle frame. The cells can be positioned in a front bank 25 or an under-carriage bank 20, or around the entire periphery of the vehicle, or any combination or subsections of these locations with varying levels of air flow restriction. The cells may also be located around the front of a trailer, around the entire trailer, and any combination or subsections of these locations, again, with varying levels of air flow restriction.

FIG. 4 shows a first embodiment of an air dam cell 30 in its inflated condition and illustrates the basic cell components: an impact resistant sleeve 39; an inflatable bladder 37, which resides within, and is restrained by, the sleeve; and a spring steel wire 36. FIG. 5 shows a deflated cell in its home, curled upward, position. The upward curl is caused by the spring steel wire 36, which in its natural state is bent into a "U" shape. The sleeve 39 has additional lengths of material in the front and back of the cell. The extra sleeve material is permanently sandwiched between two malleable strips 32, typically formed of metal, in the front and back of the cell diameter, 180 degrees apart. The malleable strip 32 has mounting tabs where the malleable strip is to be mounted to the frame of the vehicle. Each malleable strip consists of multiple cells mounted side by side, the number of cells being determined by the spatial coverage required.

The cells are made rigid pneumatically. Utilizing low pressure, low volume air, cells are interconnected by small diameter pneumatic tubing 34. Typically, no more than four cells will be interconnected thereby minimizing the potential for complete loss of air pressure should one cell malfunction. The malleable strips are designed to be modular such that strips may be replaced as needed or placed individually for location optimization.

FIGS. 6-9 illustrate an alternative embodiment of the pneumatic air dam system. Each cell 50 is made up of an impact resistant sleeve 53, that can be made of 60 durometer silicon rubber, that surrounds an inflatable bladder 55. The spring steel wire 51, or alternatively an expandable joint, which in its natural state has a "U" shape, is inserted into a channel 54 on the sleeve 53. The spring 51 causes the cell 50 to curl upward when the bladder is not inflated as shown in FIG. 7. Each cell is pressed onto a nipple 42 that is part of a supporting rail 41 or rails (FIGS. 8-10) that is mounted to the underside of the truck in locations in which the air dam system is to be installed. Each rail 41 holds multiple cells mounted side by side, the number of cells being determined by the spatial coverage required. For example, in a typical system the each side of the bullet shaped deflector has a 7 foot long straight section holding about 19 cells mounted to the truck fairing (not shown) and the arcuate section mounts about another 20 cells. One or more mounting points on the arcuate portion of the rail are fixed to the truck frame.

The cells are pushed onto the nipple 42 and may be locked into position by barbs (shown as 94 in FIG. 11) or other friction enhancing features on the nipple and may also be connected using one or more external clamps or ties (95, 112 in FIGS. 11, 12). The cells are made rigid pneumatically by a low pressure (such as about 7 psi) low volume air supply 61 (FIG. 8) that is connected to the rails 41, 43. Cells are inflated by pumping air through passages 45 in the nipple. It may be advantageous to fill the cells with air that is exhausted by various pressurized systems on truck start up.

Figure 9:
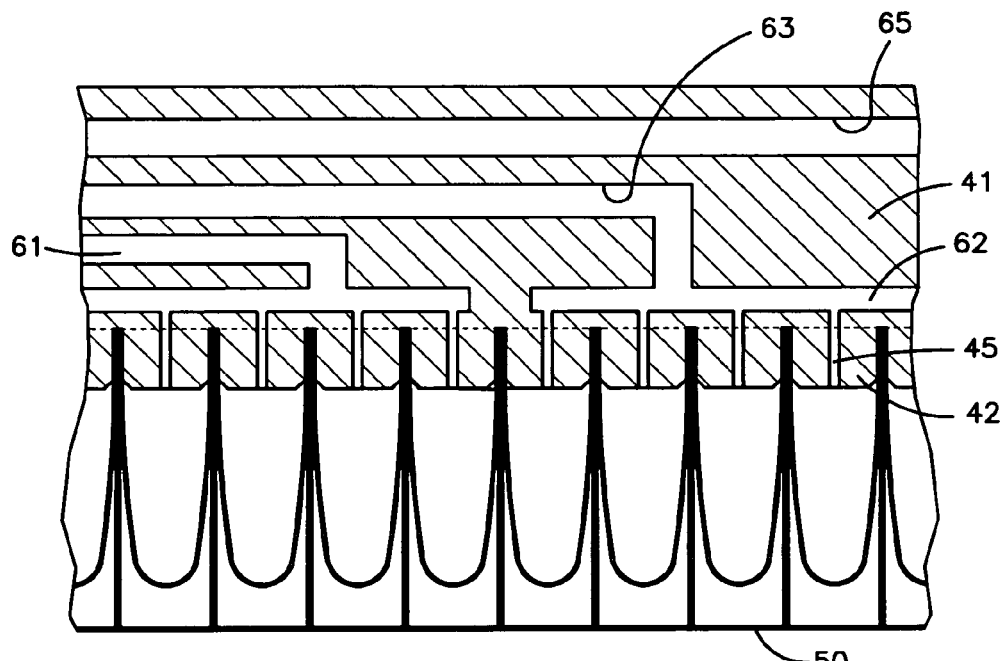
FIG. 9 is a cross sectional view of the air dam cell support and mounting structure of FIG. 8.
Figure 10:
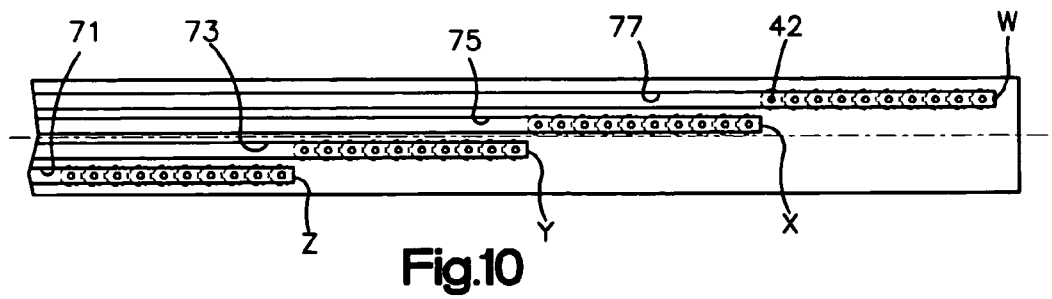
FIG. 10 is a cross sectional view of the air dam cell support and mounting structure of FIG. 8 taken orthogonally to the view of FIG. 9.

Referring now to FIG. 9 a cross section of a portion of a rail 41 or 43 is shown. The rails can be made of aluminum or fiberglass and feature circular shaped nipples for mounting the air dam cells. A number of non-intersecting interior air passages 61, 63, 65 are made in the rail. Each passage supplies air to a finite number of nipples 50, such as ten nipples. The passages are independent from each other to minimize the potential for complete loss of air pressure should one cell malfunction. The rails are designed to be modular such that they may be placed individually for location optimization. Each rail and its interior air passages are in communication with the pressurized air supply 61. FIG. 9 shows the passageways arranged vertically, in another embodiment shown in FIG. 10, there are four interior passageways 71, 73, 75, 77 equidistantly aligned side to side of the rail 41'. None of the passageways is located along the centerline of the rail, as this is where the nipples are mounted to the rail. Each of the four passageways begins where the rail is closest to the air supply such as at the front of the bullet shape as shown in FIG. 9. The passageways 71, 73, 75, 77 have varying lengths and have holes that serve as an air conduit to a nipple 42. The holes start at the termination end of each rail. Each passageway has conduits for supplying ten nipples as shown in FIG. 10.

FIGS. 11 and 12 show alternative air dam cell constructions. In FIG. 11 a inflated bladder 97 makes up the air dam cell 90. The bladder is sealed to a nipple 93 on a mounting rail 92 that does not include air channels. The bladder retains air present in the bladder during installation due to the clamping force of a clamp 95 that holds it to the rail. In this embodiment, the bladder is flexible enough to deflect under impact and is easily replaceable. FIG. 12 shows yet another embodiment in which an air dam cell 110 is made up of a flexible sleeve 117 held to a mounting rail 113 with a clamp 114. Similarly, the flexible sleeve can deflect under impact while providing sufficient wind deflection when placed adjacent other sleeves in the air dam system.

As can be seen from the foregoing description, an air dam made up of flexible cells that can be moved into and out of position can provide aerodynamic benefits to a vehicle as well as an air dam system with improved impact resistance. The location and shape of the installation on the vehicle in front and under-carriage banks allows for the air dam to be installed around the entire periphery of the vehicle including the trailer. The air dam system has the additional benefit of being less visually intrusive to the design of the vehicle.

The invention claimed is:

1. For use with a land vehicle, an air dam comprising a plurality of pneumatically-actuated deflector cells disposed adjacent to one another on an air dam frame that is to be mounted to an underside of the land vehicle, the air dam frame being configured to extend along the underside of the land vehicle, wherein with the air dam frame mounted to the land vehicle the deflector cells are each coupled to the air dam frame in a lateral spatial arrangement along the underside of the land vehicle and, when deployed, project from an upward position in a generally downward direction from the underside of the vehicle into a space between the underside of the vehicle and the ground.

2. The air dam of claim 1 wherein each deflector cell can assume a stowed position and a deployed position; wherein when the cells are in the deployed position they project from the underside of the vehicle to form the air deflecting air dam, forming a barrier covering a substantial portion of the ground clearance between the land vehicle and the ground.

3. The air dam of claim 2 comprising an actuator that selectively actuates the plurality of deflector cells between the stowed position and deployed position.

4. The air dam of claim 1 wherein each deflector cell is generally cylindrically shaped.

5. The air dam of claim 4 wherein each of said generally cylindrically shaped deflector cells include an internal bladder.

6. The air dam of claim 4 wherein each of said generally cylindrically shaped deflector cells is made from impact resistant elastomeric material.

7. The air dam of claim 6 wherein said impact resistant elastomeric material is silicon rubber.

8. The air dam of claim 7 wherein the durometer of the silicon rubber is substantially equal to 60.

9. The air dam of claim 1 wherein the air dam frame includes nipples onto which the plurality of pneumatically-actuated deflector cells are press fit.

10. The air dam of claim 9 wherein the nipples includes nipples that are adjacent to one another.

11. The air dam of claim 9 wherein an outer periphery of each nipple includes one or more barbs for engaging an inner surface of the pneumatically-actuated deflector cells.

12. The air dam of claim 9 wherein the plurality of pneumatically-actuated deflector cells are connected to a respective nipple of said nipples on the air dam frame with a circular clamp.

13. The air dam of claim 1 comprising two or more air dam frames, each supporting at least one of said plurality of pneumatically-actuated deflector cells.

14. The air dam of claim 13 wherein at least one of the one or more air dam frames extends laterally across a front of the vehicle.

15. The air dam of claim 13 wherein at least one of the one or more air dam frames is disposed on a bottom surface of the vehicle and has a generally ogival shape having a sharpness in the approximate range of 0.5-3.5 that originates at a front portion of the vehicle and radiates toward a rear portion of the vehicle such that the deflector cells route wind that encounters the vehicle between front and rear wheels of the vehicle.

16. The air dam of claim 13 wherein at least one of the one or more air dam frames is disposed on a bottom surface of a trailer carried by the vehicle and wherein the air dam has a generally ogival shape having a sharpness in an approximate range of 0.5-3.5 that originates at a middle portion of the trailer and radiates toward a rear portion of the trailer such that the deflector cells route wind that encounters the trailer forward of a wheel assembly of the trailer.

17. The air dam of claim 13 wherein at least one of the one or more air dam frames is disposed on a bottom surface of a trailer carried by the vehicle and wherein the air dam has a generally ogival shape having a sharpness in an approximate range of 0.5-3.5 that originates at a rear portion of the trailer and radiates toward a front portion of the trailer such that the deflector cells route wind that encounters the trailer aft of a rear wheel assembly of the trailer.

18. A method for deflecting air encountered by a land vehicle having a frame suspended above the ground by a plurality of wheels, the method comprising:

suspending a plurality of adjacent inflatable air dam cells between the vehicle frame and the ground in a lateral spatial arrangement spanning along an underside of the vehicle frame, wherein the lateral spatial arrangement comprises the plurality of inflatable air dam cells arranged side by side relative to each other to collectively span a portion of a width of the land vehicle;

maintaining the inflatable air dam cells in a stowed position adjacent to the underside of the vehicle frame when the inflatable air dam cells are not deployed; and inflating the inflatable air dam cells to extend the inflatable air dam cells in a downward direction generally away from the underside of the vehicle towards the ground when the inflatable air dam cells are deployed to route wind around a wheel assembly provided to the land vehicle.

19. The method of claim 18 wherein the inflatable air dam cells comprise a plurality generally cylindrical impact resistant elastomeric cells.

20. The method of claim 18 wherein said maintaining the inflatable air dam cells in the stowed position comprises asserting a biasing force on the inflatable air dam cells with a material in its approximate natural shape when the inflatable air dam cells are in the upward position, and said inflating the inflatable air dam cells comprises establishing a suitable fluid pressure in the inflatable air dam cells to overcome the biasing force exerted on the inflatable air dam cells by the material to extend the inflatable air dam cells in the downward direction.

21. The method of claim 18 wherein the step of suspending a plurality of adjacent inflatable air dam cells between the vehicle frame and ground further comprises mounting the air dam cells on a bottom surface of a trailer carried by the vehicle to form an air dam having a generally ogival shape having a sharpness in the approximate range of 0.5-3.5 that originates at a middle portion of the trailer and radiates toward a rear portion of the trailer such that the deflector cells route wind that encounters the trailer forward of a wheel assembly of the trailer.

22. A system for reducing aerodynamic drag of a wheeled vehicle, the system comprising:

a mounting fixture adapted to be supported to an underside of a vehicle frame, the mounting fixture comprising a plurality of interior passages for conveying a fluid from a fluid source to be delivered to a plurality of nipples projecting from the mounting fixture, each of the nipples defining a passage through which the fluid is to exit the nipple; and an arcuately-shaped resiliently deflectable air barrier assembly comprising a plurality of independently flexible cells that are to be coupled to the underside of the vehicle by the mounting fixture to extend from the underside of the wheeled vehicle and extend along a substantial portion of the ground clearance between the underside of the wheeled vehicle and the ground when deployed, each of the plurality of flexible cells being secured to at least one of said plurality of nipples projecting from the mounting fixture and comprising a bladder to be placed in fluid communication with at least one of the nipples when the flexible cells are secured to the nipples for receiving the fluid discharged through the passage of the at least one nipple, wherein the flexible cells are adjustable to extend into the ground clearance between the underside of the wheeled vehicle and the ground when the fluid is received within the bladder.

23. The system of claim 22 wherein the bladder of two or more, but less than all of the flexible cells is in fluid communication with a common one of the interior passages provided to the mounting fixture and the two or more of the flexible cells each receive the fluid from the common one of the interior passages.

24. The system of claim 22 wherein the mounting fixture is disposed on a bottom surface of a trailer carried by the vehicle and wherein the air barrier has a generally ogival shape having a sharpness in the approximate range of 0.5-3.5 that originates at a middle portion of the trailer and radiates toward a rear portion of the trailer such that the flexible cells route wind that encounters the wheels and wheel assemblies of the trailer.

* * * * *

UNITED STATES PATENT AND TRADEMARK OFFICE
CERTIFICATE OF CORRECTION

PATENT NO. : 7,762,615 B2  Page 1 of 1
APPLICATION NO. : 10/585174
DATED : July 27, 2010
INVENTOR(S) : Roderick M. Dayton It is certified that error appears in the above-identified patent and that said Letters Patent is hereby corrected as shown below:

On the Cover page, in item (57) ABSTRACT please delete "darn" and insert therefor --dam--.

Signed and Sealed this

Twelfth Day of October, 2010

David J. Kappos
*Director of the United States Patent and Trademark Office*